US011322932B2

(12) United States Patent
Sjökvist et al.

(10) Patent No.: US 11,322,932 B2
(45) Date of Patent: May 3, 2022

(54) CROWBAR DEVICE AND MULTISTAGE CROWBAR APPARATUS

(71) Applicant: Hitachi Energy Switzerland AG, Baden (CH)

(72) Inventors: Hans Sjökvist, Wollerau (CH); Sven Hünenmörder, Hamburg (DE); Lukas Epprecht, Brugg (CH); Thomas Schuette, Untersiggenthal (CH); Martin Studer, Gretzenbach (CH)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 16/962,666

(22) PCT Filed: Jan. 18, 2019

(86) PCT No.: PCT/EP2019/051255
§ 371 (c)(1),
(2) Date: Jul. 16, 2020

(87) PCT Pub. No.: WO2019/141811
PCT Pub. Date: Jul. 25, 2019

(65) Prior Publication Data
US 2020/0366088 A1    Nov. 19, 2020

(30) Foreign Application Priority Data

Jan. 18, 2018 (EP) .................................... 18152270

(51) Int. Cl.
*H02H 9/04* (2006.01)
*H02H 9/06* (2006.01)
(Continued)

(52) U.S. Cl.
CPC ................. *H02H 9/04* (2013.01); *H02H 3/20* (2013.01); *H02H 9/06* (2013.01); *H01H 47/00* (2013.01);
(Continued)

(58) Field of Classification Search
CPC .. H02H 9/04; H02H 9/06; H02H 3/20; H02H 3/00; H02H 3/22; H02H 9/00; H01H 83/18; H01H 47/00; H01L 27/08
(Continued)

(56) References Cited

U.S. PATENT DOCUMENTS 4,213,164 A    7/1980 Gaertner
4,321,644 A *  3/1982 Brasfield ................ H02H 9/041
                                                              327/461
(Continued)

FOREIGN PATENT DOCUMENTS

CN    102315632 A    1/2012
EP    0095902 A1    12/1983

OTHER PUBLICATIONS

International Search Report and Written Opinion of the International Searching Authority, PCT/EP2019/051255, dated Mar. 27, 2019, 11 pages.
(Continued)

*Primary Examiner* — Danny Nguyen
(74) *Attorney, Agent, or Firm* — Sage Patent Group

(57) ABSTRACT

A crowbar device has a first terminal and a second terminal, the terminals being connectible to a medium to high impedance AC voltage source including a trigger circuit configured to output a trigger signal responsive to exceeding a threshold voltage across at least one trigger element of the trigger circuit; a positive-side signaling circuit and a negative-side signaling circuit configured to output a positive or a negative clamping signal, respectively, according to a
(Continued)

positive-voltage or a negative-voltage signal, respectively, input from the trigger circuit; and a positive-side overvoltage clamping circuit and a negative-side overvoltage clamping circuit configured to control their respective semiconductor element to be in a conducting state, when the clamping signal from the corresponding signaling circuit is present, and configured to control their semiconductor element to be in a non-conducting state, when the corresponding clamping signal has not been present for a predetermined time period.

18 Claims, 3 Drawing Sheets

(51) Int. Cl.
      *H02H 3/20*     (2006.01)
      *H02H 3/22*     (2006.01)
      *H01H 83/18*    (2006.01)
      *H01H 47/00*    (2006.01)
      *H02H 3/00*     (2006.01)

(52) U.S. Cl.
      CPC ............... *H01H 83/18* (2013.01); *H02H 3/00* (2013.01); *H02H 3/22* (2013.01)

(58) Field of Classification Search
      USPC ........................... 361/56, 91.1, 111, 117–120
      See application file for complete search history.

(56) References Cited

U.S. PATENT DOCUMENTS

| | | | | |
|---|---|---|---|---|
| 5,666,255 | A * | 9/1997 | Muelleman | H02H 9/005 |
| | | | | 361/111 |
| 6,226,162 | B1 * | 5/2001 | Kladar | H02H 3/44 |
| | | | | 361/111 |
| 6,707,656 | B1 | 3/2004 | Marshall | |
| 2007/0217237 | A1 * | 9/2007 | Salvestrini | H05B 39/08 |
| | | | | 363/125 |
| 2009/0323243 | A1 | 12/2009 | Moorish | |
| 2012/0300352 | A1 * | 11/2012 | de Palma | H02H 9/041 |
| | | | | 361/91.5 |

OTHER PUBLICATIONS

Chinese First Office Action dated Sep. 16, 2021 for Chinese Patent Application No. 201980009331.2, 14 pages (including English summary of Office Action).

* cited by examiner

CROWBAR DEVICE AND MULTISTAGE CROWBAR APPARATUS

CROSS REFERENCE TO RELATED APPLICATIONS

This application is a 35 U.S.C. § 371 national stage application of PCT International Application No. PCT/EP2019/051255 filed on Jan. 18, 2019, which in turns claims foreign priority to European Patent Application No. 18152270.7, filed on Jan. 18, 2018, the disclosures and content of which are incorporated by reference herein in their entirety.

TECHNICAL FIELD

The present disclosure relates to a crowbar device and a multistage crowbar apparatus connectible to a medium to high impedance AC voltage source.

Crowbar circuits are typically used to protect a technical equipment connected to a source of a power supply from damages due to an overvoltage, such as an overvoltage stemming from transient effects like switching operations in a network. A type of an equipment connected to a high-voltage power supply part, such as an AC high-voltage bushing, is a measurement circuit. For example, in an AC high-voltage bushing a high-voltage divider is used for connecting such a measurement circuit. In a high-voltage bushing, the high-voltage divider may comprise, for example, an equipotential surface of a bushing component arranged in an outer layer of the bushing, such as the second outermost layer of the bushing.

The high-voltage divider in such an exemplary kind of application makes the voltage source sensed by the measurement circuit a medium to high impedance AC voltage source. A medium to high impedance AC voltage source, as used herein, refers to a non-ideal AC voltage source having a significant and not negligible impedance, such as a significant internal capacitance. A non-negligible impedance may be assumed as an impedance having a value at which a load (a load sink, e. g. a conventional overvoltage protection circuit) undergoes an overload condition, such as a thermal overload.

The measurement circuit may comprise, for example, a voltage measurement circuit. When the impedance is a known quantity, a measurement value (a measured voltage) measured by the measurement circuit (the voltage measurement circuit) can be referred to the known impedance, and an actual high voltage in the high-voltage device (e.g. high-voltage bushing) can be determined.

RELATED ART

Overvoltages on the high-voltage bushing may occur e. g. due to transients in the AC voltage supply, or due to an internal failure of the high-voltage divider. A transient in the AC voltage supply occurs for a relatively short period of time, whereas an internal failure of the high-voltage divider may lead to a permanent overvoltage, which has to be coped with.

In order to protect the equipment (the measurement equipment) that is to be connected to the medium to high impedance voltage source (the high-voltage divider) from those overvoltages, it is known to connect a crowbar circuit, or clamping circuit, between the equipment and the medium to high impedance voltage source.

One type of a conventional crowbar circuit comprises for example a surge arrester or a varistor, which serve as a protective device. Here, the discharge losses are small, but the conduction losses are significant. Thus, these types of crowbar circuits are effective in dissipating transient voltages. However, these types of conventional crowbar circuits suffer from the high conduction losses in the case of a permanent overvoltage failure, which may lead to the destruction of the protective device of the crowbar circuit.

On the other hand, another type of a conventional crowbar circuit comprises a device that can reduce the voltage across the crowbar circuit near zero. Examples for such a device include a spark gap or spark discharger, a thyristor, a DIAC or a SIDAC. These devices are usable for low-impedance AC voltage sources, i. e. nearly-ideal AC voltage sources having a low internal resistance or internal impedance.

Another type of a conventional crowbar circuit for DC application uses a semiconductor element connected between the terminals of the equipment to be protected. The semiconductor element, such as a transistor, is controllable between a conducting state and a non-conducting state. In the conventional DC application, a failure signal has to be input to the DC crowbar circuit in order to trigger a power surge clamping operation.

Problems to be Solved by the Disclosure

In medium to high impedance AC voltage source applications, the impedance of the AC voltage source is too high to keep the above-mentioned types of devices in a conducting state. In other words: A threshold value, e. g. a voltage threshold value, for keeping these types of devices in a conducting state is not met during the entire period in which the device is intended to dissipate a permanent-type overvoltage. In such an exemplary case, an alternating operation of the device may occur, wherein the device turns on and off in an alternating way. Such a multiple triggering may lead to high discharge losses which are in the same order of magnitude as the use of e. g. a surge arrester or a varistor.

The conventional AC devices are not suitable for a prolonged power surge clamping, such as those occurring in a permanent failure state of a high impedance voltage source. The conventional DC devices cannot be applied to alternating currents, and rely upon an external failure signal to trigger a power surge clamping.

With respect to the devices that reduce the voltage across the crowbar circuit near zero, high impedance voltage sources may not have the ability to supply a necessary holding current for these devices, which leads to an unwanted turn-off of the protective device and a recharging operation of the overvoltage condition at the voltage source. Subsequent triggering leads to high power losses in the protective device, which may lead to its destruction.

Thus, there is a need for a crowbar device which can be used in AC applications, which is reliable and performs a safe power clamping operation also for a prolonged period of time.

Solution to the Problems

According to an aspect of the present disclosure, a crowbar device has a first terminal and a second terminal. The terminals are connectible to a medium to high impedance AC voltage source. The crowbar device comprises a trigger circuit, a positive-side signaling circuit, a positive-side overvoltage clamping circuit, a negative-side signaling circuit, and a negative-side overvoltage clamping circuit.

The trigger circuit is a circuit connected between the first terminal and the second terminal and configured to output a trigger signal responsive to exceeding a threshold voltage across at least one trigger element of the trigger circuit.

The positive-side signaling circuit is configured to output a positive clamping signal according to a positive-voltage signal input from the trigger circuit. The negative-side signaling circuit is configured to output a negative clamping signal according to a negative-voltage signal input from the trigger circuit.

The positive-side overvoltage clamping circuit comprises a controllable semiconductor element connected between the first terminal and the second terminal. The positive-side overvoltage clamping circuit is configured to control the semiconductor element to be in a conducting state when the positive clamping signal from the positive-side signaling circuit is present, and it is configured to control the semiconductor element to be in a non-conducting state when the positive clamping signal has not been present for a predetermined time period.

The negative-side overvoltage clamping circuit comprises a controllable semiconductor element connected between the first terminal and the second terminal. The negative-side overvoltage clamping circuit is configured to control the semiconductor element to be in a conducting state when the negative clamping signal from the negative-side signaling circuit is present, and it is configured to control the semiconductor element to be in a non-conducting state when the negative clamping signal has not been present for a predetermined time period.

A medium to high impedance AC voltage source is typically a non-ideal AC voltage source having a significant and not negligible impedance, such as a significant internal capacitance. A non-negligible impedance may be assumed as an impedance having a value at which a load (a load sink, e. g. a conventional overvoltage protection circuit) undergoes an overload condition, such as a thermal overload. A medium to high impedance AC voltage source is typically an AC voltage source with limited stored energy and limited power.

The controllable semiconductor element in the positive-side overvoltage clamping circuit may be referred to as a positive-side semiconductor element. The controllable semiconductor element in the negative-side overvoltage clamping circuit may be referred to as a negative-side semiconductor element.

The positive-side semiconductor element is connected with its main path between the first terminal and the second terminal. Likewise, the negative-side semiconductor element is connected with its main path between the first terminal and the second terminal. The main path is a main current-carrying path of the respective semiconductor element, such as a source-drain path of a FET.

The crowbar device is generic in that it clamps, or shunts, any kind of periodic AC signal from AC voltage sources with limited stored energy and limited power (i. e. a medium to high impedance AC voltage source).

The crowbar device has practically no minimum requirement for a holding current. In other words: The crowbar device needs no threshold current to maintain the clamping function once it has been triggered, and has a holding function (i. e. it is configured to maintain the clamping function) that keeps the clamping for at least the predetermined period of time.

The crowbar device can clamp, or shunt, overvoltages of either polarity, e. g. to ground. It will stay in the clamping state for the predetermined time. Subsequently, it reverts to the non-clamping state, i. e. reverts the semiconductor element in the respective positive-side or negative-side clamping circuit to the non-conducting state.

In addition, unlike applications using a traditional clamping device such as a surge arrester or a varistor, the crowbar device exhibits very low conduction losses during the clamping state. The conduction losses across the respective semiconductor element are significantly lower than the losses over a surge arrester or a varistor in the clamping state.

The technique of the present disclosure may help to obtain a self-sustaining and self-resetting overvoltage protection functionality for AC voltage sources having a medium to high impedance, for both positive and negative polarity overvoltages. The power losses during a voltage limiting operation are comparatively low, as is the number of parts of the device. The principle of functionality is comparatively simple, while at the same time allowing for a continuous safe operation in case of a failure, e. g. due to excessive temperature.

With the technique disclosed herein, a crowbar device is provided that does not need any auxiliary, or secondary, power source. It is designed to operate only via a voltage supplied from a medium to high impedance voltage source that is also the source of possible transient or permanent overvoltages that the crowbar device is intended to offer a protection function for.

In some embodiments of the disclosure, the crowbar device is connectible to an AC voltage source comprising a high-voltage bushing and a high-voltage divider.

According to another aspect of the disclosure, a multistage crowbar apparatus is provided. The multistage crowbar apparatus comprises a plurality of crowbar devices described herein in a stacked configuration. With the herein-described multistage crowbar apparatus, the crowbar devices can be stacked to multiple stages to increase the threshold voltage, which may help to overcome the voltage ratings of single semiconductor devices used in the overvoltage clamping circuits.

When stacking the crowbar devices, each trigger circuit limits the voltage that the semiconductor elements in the respective overvoltage clamping circuits are subjected to, which means that no additional balancing of the stacked crowbar devices is needed. This may help to simplify the design and configuration.

BRIEF DESCRIPTION OF THE DRAWINGS

In the following, exemplary embodiments of the disclosure will be described with reference to the drawings in which.

EMBODIMENTS OF THE DISCLOSURE

The embodiments described below with reference to the accompanying drawings are illustrative in every aspect and may be combined with one another and/or modified and/or abbreviated and/or omitted as appropriate.

Figure 1:
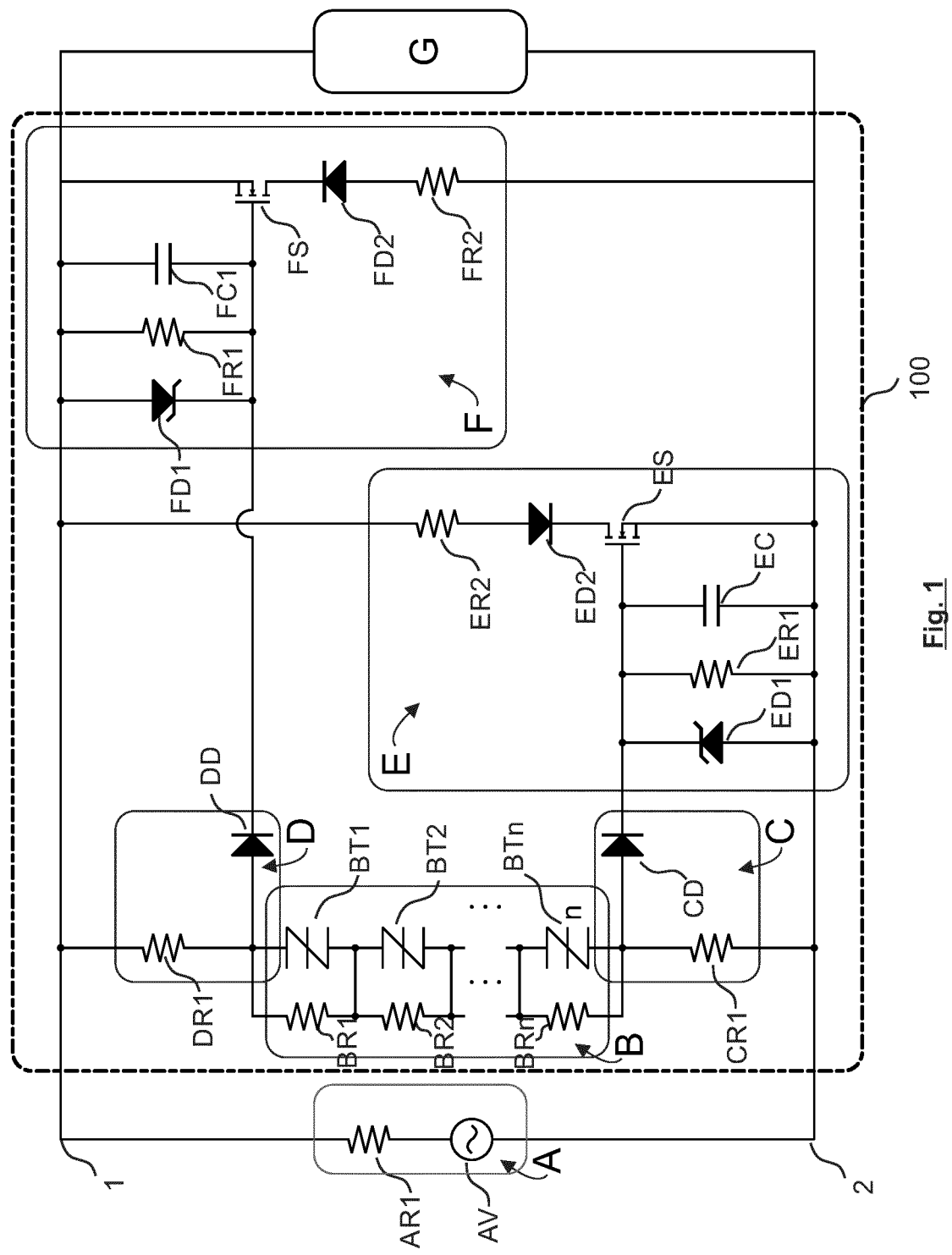
FIG. 1 shows a circuit diagram showing an exemplary configuration of a crowbar device according to an embodiment of the disclosure.
Figure 2:
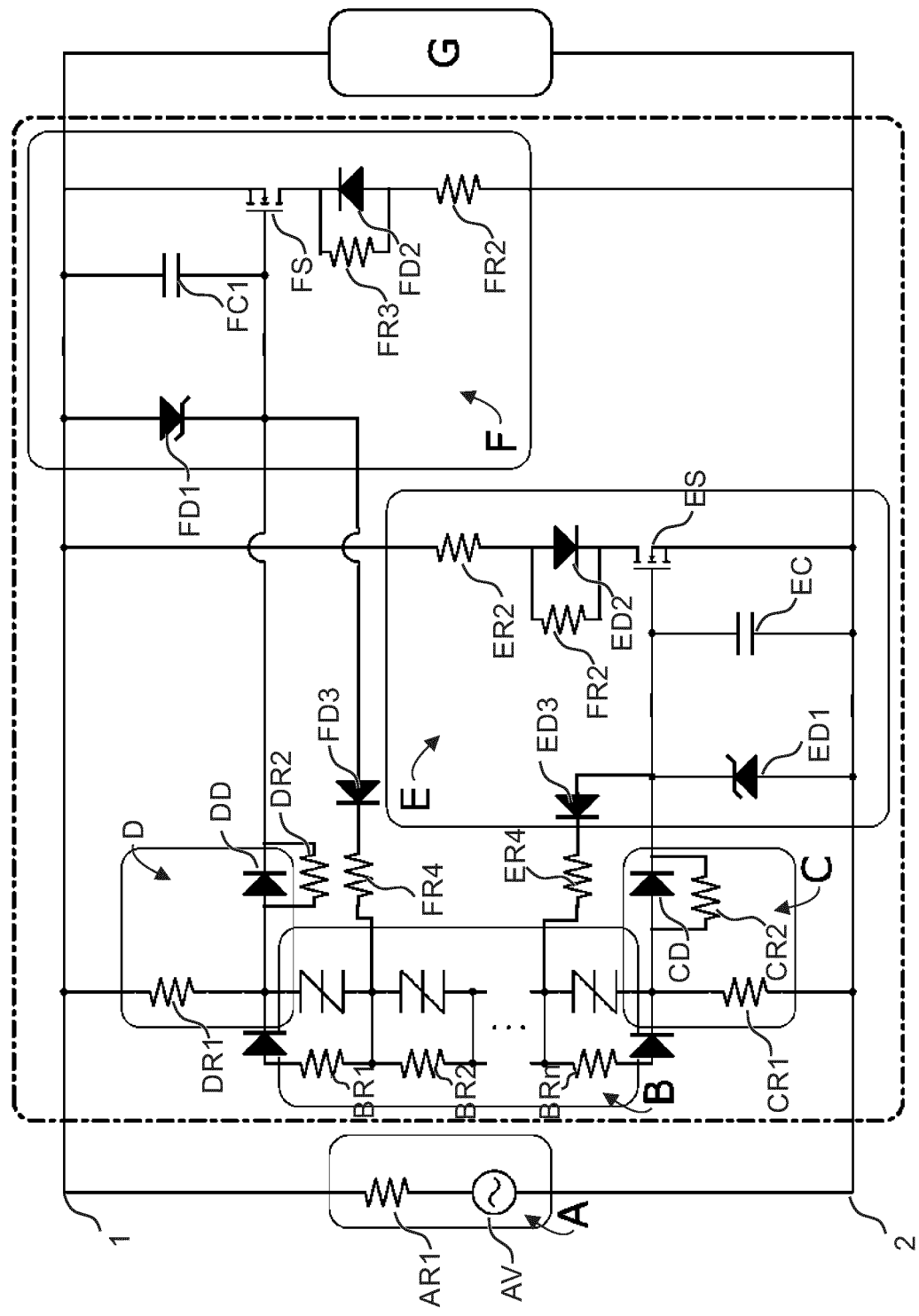
FIG. 2 shows a circuit diagram showing an exemplary configuration of a crowbar device according to another embodiment of the disclosure.

FIGS. 1 and 2 each illustrate a circuit diagram showing an exemplary configuration of a crowbar device according to an embodiment of the disclosure.

Figure 3:
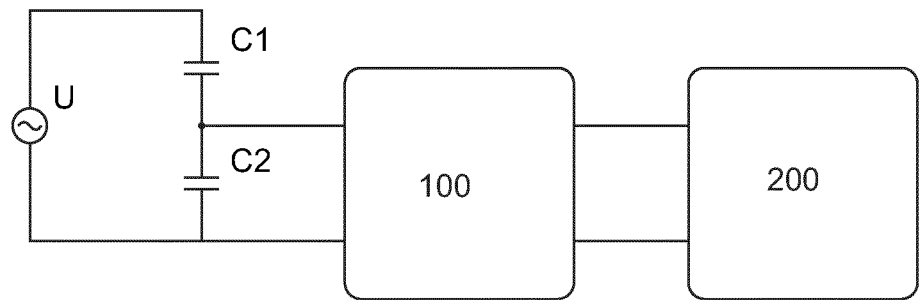
FIG. 3 shows an exemplary configuration of a high impedance voltage source having a crowbar device and an equipment connected thereto.

FIG. 3 shows an exemplary configuration of a high impedance voltage source U having a crowbar device 100 and an equipment 200 connected thereto. The voltage source U corresponds to the voltage source AV in FIGS. 1 and 2. In FIG. 3, the capacitors C1 and C2 illustrate the high impedance properties of the voltage source U. For example, the voltage source U has a capacitance C2 between signal and ground. The overvoltage protection circuit, or crowbar device 100, is connected between the terminals of capacitance C2. In case of operation of the crowbar device, it discharges the capacitance C2 between signal and ground. In the case of a prolonged operation of the crowbar device, an additional capacitance C1 contributes to the conduction losses of the circuit.

For conventional clamping overvoltage protection devices (surge arresters, varistors, etc.) the discharge losses are small, but the conduction losses are higher than a conventional protection device can sustain for a prolonged time, e. g. for longer than several 10 to several 100 cycles of the AC voltage frequency.

Referring back to FIG. 1, element block A includes a voltage source AV and a series resistor AR1 defining an internal resistance of the voltage source AV. In the present application, internal resistance AR1 is medium to high and sufficient to limit conduction losses to a manageable extent. Element block A corresponds to voltage source U of FIG. 3. Element block G includes an equipment, such as a measurement equipment, and correspond to equipment 200 in FIG. 3. The equipment in block G is to be protected from transient or permanent overvoltages of the voltage source.

Element blocks B, C, D, E, F constitute a crowbar device 100 according to an embodiment of the present disclosure. Element block B corresponds to a trigger circuit in the claims. Element block C corresponds to a positive-side signaling circuit in the claims. Element block D corresponds to a negative-side signaling circuit in the claims. Element block E corresponds to a positive-side overvoltage clamping circuit in the claims. Element block F corresponds to a negative-side overvoltage clamping circuit in the claims.

Element block B includes a plurality of series-connected (stacked) trigger elements BT1, BT2, . . . BTn, including, but not limited to, DIACs (diode for alternating current), SIDACs (silicon thyristor for alternating current) or spark gaps. n is a positive integer and may be, but not limited to, n=6 or n=8 or n=10, for example. A total threshold voltage of the stack of trigger elements BT1, BT2 . . . BTn defines a trigger voltage of the trigger circuit B. Typically, trigger elements BT1, BT2 . . . BTn are semiconductor elements, as spark gaps exhibit wear and may fail after some time of operation.

The trigger elements BT1, BT2 . . . BTn are chosen such that they are not of a limiting type (cap), but rather to forcefully trigger for any magnitude of overvoltages.

Element block C includes a resistor CR1 connected between terminal 2 of block A and an anode side of a diode CD. Resistor CR1 sees a current spike (dI/dt) when block B is triggered. The resulting voltage is diverted using diode CD to an output of block C. Block C is triggered for positive polarity overvoltages. The diode CD blocks a reverse-polarity voltage and ensures that block C only signals positive-polarity voltages.

Element block C as the positive-side signaling circuit outputs a positive clamping signal when a positive-voltage signal is input from the trigger circuit of block B. The clamping signal is output to the corresponding positive-side overvoltage clamping circuit in block E. In the present embodiment, the current spike (dI/dt) makes the clamping signal a time derivative of a current of the positive-voltage signal.

Element block D includes a resistor DR1 connected between terminal 1 of block A and an anode side of a diode DD. Resistor DR1 sees a current spike (dI/dt) when block B is triggered. The resulting voltage is diverted using diode DD to an output of block D. Block D is triggered for negative polarity overvoltages. As such, block D is the negative polarity counterpart of block C. The diode DD blocks a reverse-polarity voltage and ensures that block D only signals negative-polarity voltages.

Element block D as the negative-side signaling circuit outputs a negative clamping signal when a negative-voltage signal is input from the trigger circuit of block B. The clamping signal is output to the corresponding negative-side overvoltage clamping circuit in block F. In the present embodiment, the current spike (dI/dt) makes the clamping signal a time derivative of a current of the negative-voltage signal.

Element block E includes a Zener diode ED1 that limits the voltage at a gate of MOSFET ES. Drain and Source of MOSFET ES are connected, via reverse flow blocking diode ED2 and resistor ER2, between terminals 1 and 2 of block A. Note that the Zener type for diode ED1 is only exemplary, and a different kind of voltage-limiting diode, such as a TVS diode, may be employed, as long as its operation time (trigger time) in the case of a reverse-direction overvoltage is sufficiently short. Resistor ER2 is optional, and it is used to distribute conduction losses between MOSFET ES and a potentially larger resistor with a heatsink. Reverse flow blocking diode ED2 blocks the reverse polarity for block E from shunting opposite (negative) polarity voltages. The gate of MOSFET ES is triggered by the output signal from block C. As long as the gate of MOSFET ES is sufficiently charged by the output signal from block C, the source-drain path of MOSFET ES is in a conducting state, establishing a clamping function via the current path of resistor ER2, diode ED2, and MOSFET ES. This clamping function defines the main crowbar functionality for positive overvoltages.

Resistor ER1 and capacitor EC determine a time constant during which the output signal from block C is held on a level which keeps the gate of MOSFET ES charged. Once triggered, MOSFET ES is kept in the conducting state as long as the output signal from block C does not disappear for a time period that is longer in duration than the time constant. Trigger block B is essentially bypassed by MOSFET ES in the conducting state, and the voltage from the voltage source AV is kept at a low level. In other words: Function block E keeps MOSFET ES in a self-holding or self-sustaining conducting state unless the output signal from block C is not present for a longer time than the duration determined by the time constant.

Element block F is the negative polarity counterpart of block E. Element block F includes a Zener diode FD1 that limits the voltage at a gate of MOSFET FS. Note that the Zener type for diode FD1 is only exemplary, and a different kind of voltage-limiting diode, such as a TVS diode, may be employed, as long as its operation time (trigger time) in the case of a reverse-direction overvoltage is sufficiently short. Drain and Source of MOSFET FS are connected, via reverse flow blocking diode FD2 and resistor FR2, between terminals 1 and 2 of block A. Resistor FR2 is optional, and it is used to distribute conduction losses between MOSFET FS and a potentially larger resistor with a heatsink. Reverse flow blocking diode FD2 blocks the reverse polarity for block F from shunting opposite (positive) polarity voltages. The gate of MOSFET FS is triggered by the output signal from block D. As long as the gate of MOSFET FS is sufficiently charged by the output signal from block D, the source-drain path of MOSFET FS is in a conducting state, establishing a clamping function via the current path of resistor FR2, diode FD2, and MOSFET FS. This clamping function defines the main crowbar functionality for negative overvoltages.

Resistor FR1 and capacitor FC determine a time constant during which the output signal from block D is held on a level which keeps the gate of MOSFET FS charged. Once triggered, MOSFET FS is kept in the conducting state as long as the output signal from block D does not disappear for a time period that is longer in duration than the time constant. Trigger block B is essentially bypassed by MOSFET FS in the conducting state, and the voltage from the voltage source AV is kept at a low level. In other words: Function block F keeps MOSFET FS in a self-holding or self-sustaining conducting state unless the output signal from block D is not present for a longer time than the duration determined by the time constant.

Parallel resistors BR1, BR2 . . . BRn in block B serve as discharging resistors for the capacitance of the MOSFETs ES, FS gates. Resistors BR1, BR2 . . . BRn are in the order of 1 MOhm. In embodiments, resistors BR1, BR2 . . . BRn are chosen such that they are as large as possible, and at the same time sufficiently small to discharge the gates of MOSFETs ES, FS in about a quarter cycle of the frequency of the voltage source AV.

In blocks E and F, typically, the time constant determined by resistor ER1/FR1 and capacitor EC/FC is chosen such that it is at least as long as a cycle determined by a frequency of the AC voltage source. For example, if the crowbar device described herein is designed to be connected to a medium to high impedance AC voltage source operating at a frequency of 50 Hz, the time constant is at least 0.02 s, and it may be longer according to a usage scenario. The capacitance of capacitor EC/FC is typically chosen such as to be dischargeable in about a quarter period of the frequency determined by the voltage source AV that the crowbar device is designed to be connected to.

In blocks E and F, the semiconductor element is not limited to a MOSFET ES, FS, but rather any suitable controllable semiconductor element which is switchable from a non-conducting state to a conducting state and vice-versa with help of a control signal may be used. Any semiconductor device is chosen to be voltage rated at least up to the trigger voltage (total threshold voltage of trigger elements BT1, BT2 . . . BTn).

A MOSFET is favorable in that an appropriately selected power MOSFET has a comparatively low conduction loss. When MOSFETs are used in blocks E and F, the resistance between source and drain in the conducting state ($R_{DS,\,on}$) is chosen as small as possible. For example, a MOSFET having about 4.5 kV blocking voltage may have about $R_{DS,\,on}$=700 Ohms.

In blocks E and F, the resistors ER2, FR2 typically have a low parasitic inductance to allow a fast switching operation. Diodes ED2, FD2 are selected to have a rated voltage of at least the trigger voltage (total threshold voltage of trigger elements BT1, BT2 . . . BTn).

Diodes ED1, FD1 are selected such as to have sufficiently fast reverse conduction times (breakdown conduction times), such as several nanoseconds. Typically, they have significantly faster revers conduction times than the forward switching times (forward conduction times) of diodes CD, DD in blocks C and D, respectively.

In the corresponding relationship of signaling block C and overvoltage clamping block E for positive polarity overvoltages, the Zener diode ED1 is chosen to operate faster than the signaling diode CD, in order to effectively protect the gate of MOSFET ES from overvoltages.

Similarly, in the corresponding relationship of signaling block D and overvoltage clamping block F for positive polarity overvoltages, the Zener diode FD1 is chosen to operate faster than the signaling diode FD, in order to effectively protect the gate of MOSFET FS from overvoltages.

Figure 4:
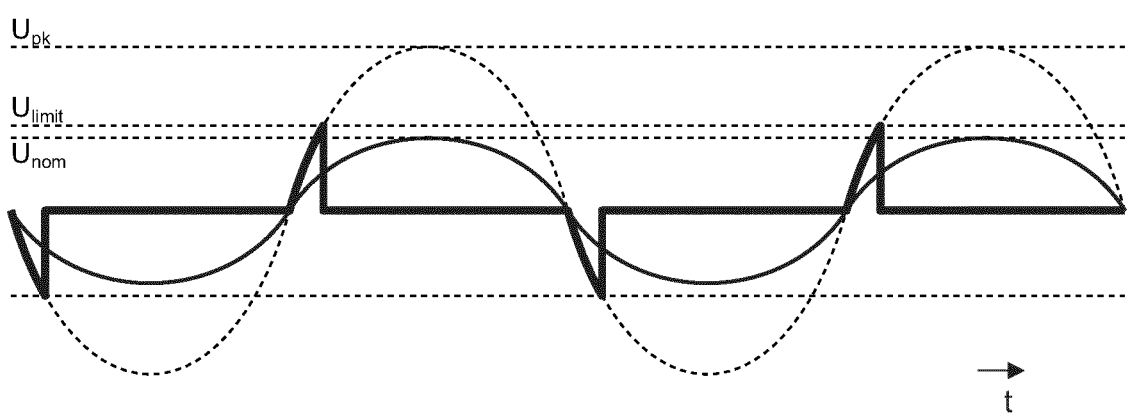
FIG. 4 shows a waveform for a permanently failed voltage source for explanatory purposes.

In FIG. 4, a waveform for a permanently failed voltage source U is shown. $U_{nom}$ denotes a nominal peak value for the voltage waveform during normal operation, $U_{limit}$ denotes a voltage limit threshold due to the permanent failure, and $U_{pk}$ is a peak voltage due to voltage surges. Under normal operation, a waveform as illustrated by the thin continuous line in FIG. 4 is exhibited which does not exceed $U_{nom}$. For a voltage source AV having a permanent overvoltage failure, without a crowbar device as described herein, the waveform would exceed the rated or nominal voltage $U_{nom}$ and reach the peak voltage $U_{pk}$ in each AC cycle, as shown by the dotted line in FIG. 4. This may lead to destruction in any equipment, such as measurement equipment, connected thereto.

When a crowbar circuit as described herein is employed, the waveform will look similar to the one illustrated by the bold continuous line in FIG. 4. The voltage limit threshold $U_{limit}$ corresponds to the threshold value determined by the total threshold of the stacked trigger elements BT1, BT2 . . . BTn in function block B. As illustrated in FIG. 4, a permanently failed voltage source A outputs a repeating overvoltage in each cycle, which is detected in each cycle via function block B, for both polarities, and shunted to ground via the corresponding signaling circuit C, D and overvoltage clamping circuit E, F of the positive side and the negative side, respectively. The parameters of the components in circuit blocks B, C, D, E, F are chosen appropriately according to the desired voltage threshold, a discharge energy and the expected conduction losses.

FIG. 2 shows a circuit diagram showing an exemplary configuration of a crowbar device according to another embodiment of the disclosure. Elements and parts having the same or a comparable function to those in FIG. 1 are denoted with the same reference signs. Their explanation will not be repeated herein below.

In FIG. 2, the time-constant defining resistors ER1 in block E and FR1 in block F have been removed. In block E, an additional diode ED3 is connected, in its reverse direction and via a resistor ER4, to an interconnection between the first trigger BTn element and the second trigger element BTn−1 of block B when seen from terminal 2, and the gate of MOSFET ES. Similarly, in block F, an additional diode FD3 is connected, in its reverse direction and via a resistor FR4, to an interconnection between the first trigger element BT1 and the second trigger element BT2 of block B when seen from terminal 1, and the gate of MOSFET FS.

In the embodiment of FIG. 2, a holding time of blocks E and F, i. e. the time that the gate of MOSFET ES, FS is kept charged and the corresponding MOSFET is in a conducting state for providing a clamping operation, is determined by the additional diode ED3 or FD3, respectively. By such a configuration, the holding the MOSFET ES, FS in the conduction state and resetting the MOSFET ES, FS to the non-conducting state is defined by the trigger block B rather than a (fixed) time constant, which may lead to an improved clamping behavior of the crowbar device.

The invention claimed is:

1. A crowbar device having a first terminal and a second terminal, the terminals being connectible to a medium to high impedance AC voltage source, the crowbar device comprising:
a trigger circuit connected between the first terminal and the second terminal and configured to output a trigger signal responsive to exceeding a threshold voltage across at least one trigger element of the trigger circuit;
a positive-side signaling circuit configured to output a positive clamping signal according to a positive-voltage signal input from the trigger circuit;
a positive-side overvoltage clamping circuit comprising a controllable semiconductor element connected between the first terminal and the second terminal, the positive-side overvoltage clamping circuit being configured to control the semiconductor element to be in a conducting state when the positive clamping signal from the positive-side signaling circuit is present, and configured to control the semiconductor element to be in a non-conducting state when the positive clamping signal has not been present for a predetermined time period;
a negative-side signaling circuit configured to output a negative clamping signal according to a negative-voltage signal input from the trigger circuit;
a negative-side overvoltage clamping circuit comprising a controllable semiconductor element connected between the first terminal and the second terminal, the negative-side overvoltage clamping circuit being configured to control the semiconductor element to be in a conducting state when the negative clamping signal from the negative-side signaling circuit is present, and configured to control the semiconductor element to be in a non-conducting state when the negative clamping signal has not been present for a predetermined time period; and
a diode connected, in a reverse direction, between an interconnection within the trigger circuit and an element of one of the positive-side overvoltage clamping circuit and the negative-side overvoltage clamping circuit, the predetermined time period at least partially determined by a time constant of the diode.

2. The crowbar device according to claim 1, wherein the positive-side signaling circuit is configured to output the positive clamping signal according to a time derivative of a current of the positive-voltage signal.

3. The crowbar device according to claim 1, wherein the predetermined time period is selected to be at least as long as a cycle determined by a frequency of the AC voltage source.

4. The crowbar device according to claim 1, wherein the trigger circuit comprises a stack of serially-connected trigger elements, the trigger circuit being configured to output the trigger signal responsive to exceeding the threshold voltage across the stack of serially-connected trigger elements.

5. The crowbar device according to claim 4, wherein the diode is connected, in a reverse direction, between an interconnection within the stack of serially-connected trigger elements and the element of at least one of the positive-side overvoltage clamping circuit and the negative-side overvoltage clamping circuit.

6. The crowbar device according to claim 1, wherein the at least one trigger element comprises at least one of a spark gap, a DIAC, and a SIDAC.

7. The crowbar device according to claim 1, wherein at least one of the controllable semiconductor element of the positive-side overvoltage clamping circuit and the controllable semiconductor element of the negative-side overvoltage clamping circuit comprises a transistor.

8. The crowbar device according to claim 1, wherein the positive-side signaling circuit comprises a diode connected, in the forward direction, between a terminal of the trigger circuit and a control terminal of the semiconductor element of the positive-side overvoltage clamping circuit.

9. The crowbar device according to claim 8, wherein the positive-side overvoltage clamping circuit and the negative-side overvoltage clamping circuit each comprises a reverse-connected voltage-limiting diode, connected such as to limit a voltage at the control terminal of the respective semiconductor element.

10. The crowbar device according to claim 9, wherein at least one of the diode of the positive-side signaling circuit and the diode of the negative-side signaling circuit is configured to have a slower switching characteristic than the respective reverse-connected voltage-limiting diode of at least one of the positive-side overvoltage clamping circuit and the negative-side overvoltage clamping circuit.

11. The crowbar device according to claim 1, being configured to be functional only by an AC voltage supplied externally to the first and second terminals.

12. The crowbar device according to claim 1, wherein at least one of the semiconductor element of the positive-side overvoltage clamping circuit and the semiconductor element of the negative-side overvoltage clamping circuit is configured to be in a conducting state when the voltage source is in a failure state.

13. The crowbar device according to claim 7, wherein the transistor comprises a MOSFET.

14. The crowbar device according to claim 9, wherein the voltage-limiting diode comprises a Zener diode.

15. The crowbar device according to claim 1, wherein the negative-side signaling circuit is configured to output the negative clamping signal according to a time derivative of a current of the negative-voltage signal.

16. The crowbar device according to claim 1, wherein the negative-side signaling circuit comprises a diode connected, in the forward direction, between a terminal of the trigger circuit and a control terminal of the semiconductor element of the negative-side overvoltage clamping circuit.

17. A crowbar device having a first terminal and a second terminal, the terminals being connectible to a medium to high impedance AC voltage source, the crowbar device comprising:
a trigger circuit connected between the first terminal and the second terminal and configured to output a trigger signal responsive to exceeding a threshold voltage across at least one trigger element of the trigger circuit;
a signaling circuit configured to output a clamping signal according to a positive-voltage signal input from the trigger circuit;

an overvoltage clamping circuit comprising a controllable semiconductor element connected between the first terminal and the second terminal, the overvoltage clamping circuit being configured to control the semiconductor element to be in a conducting state when the clamping signal from the signaling circuit is present, and configured to control the semiconductor element to be in a non-conducting state when the clamping signal has not been present for a predetermined time period; and a diode connected, in a reverse direction, between an interconnection within the trigger circuit and an element of the overvoltage clamping circuit, wherein the predetermined time period is at least partially determined by a time constant of the diode.

18. A crowbar device having a first terminal and a second terminal, the terminals being connectible to a medium to high impedance AC voltage source, the crowbar device comprising:

a trigger circuit connected between the first terminal and the second terminal and configured to output a trigger signal responsive to exceeding a threshold voltage across at least one trigger element of the trigger circuit;

a signaling circuit comprising a diode, the signaling circuit configured to output a clamping signal according to a signal input from the trigger circuit;

a overvoltage clamping circuit comprising a controllable semiconductor element connected between the first terminal and the second terminal, the overvoltage clamping circuit being configured to control the semiconductor element to be in a conducting state when the clamping signal from the signaling circuit is present, and configured to control the semiconductor element to be in a non-conducting state when the clamping signal has not been present for a predetermined time period, the overvoltage clamping circuit further comprising a reverse-connected voltage limiting diode, the diode of the signaling circuit diode connected, in the forward direction, between a terminal of the trigger circuit and a control terminal of the semiconductor element, and the diode of the signaling circuit configured to have a slower switching characteristic than the voltage-limiting diode of the overvoltage clamping circuit.

\* \* \* \* \*